June 28, 1932. R. F. SMITH 1,865,284
METAL PLATE CONSTRUCTION AND METHOD OF FORMING THE SAME
Filed April 21, 1931
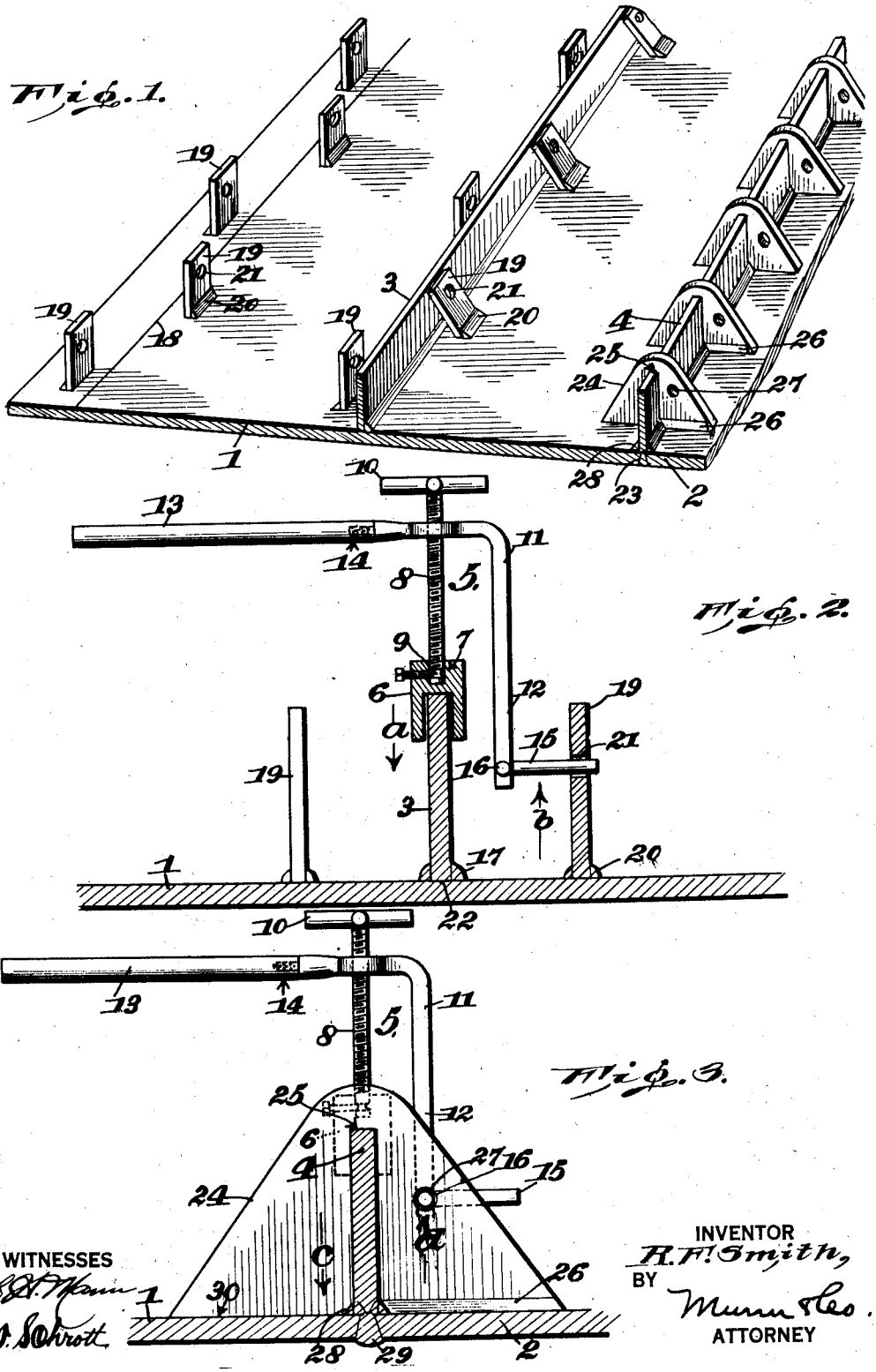
INVENTOR
R. F. Smith,
BY
ATTORNEY
WITNESSES Patented June 28, 1932

1,865,284

UNITED STATES PATENT OFFICE

RICHARD F. SMITH, OF NEW YORK, N. Y., ASSIGNOR OF ONE-HALF TO CHARLESTON DRY DOCK & MACHINE COMPANY, OF CHARLESTON, SOUTH CAROLINA, A CORPORATION OF DELAWARE, ONE-FOURTH TO CHARLES V. BOYKIN AND SAMUEL A. GUILDS, BOTH OF CHARLESTON, SOUTH CAROLINA, AND ONE-FOURTH TO RAYMOND D. SULLIVAN, OF SAVANNAH, GEORGIA

METAL PLATE CONSTRUCTION AND METHOD OF FORMING THE SAME

Application filed April 21, 1931. Serial No. 531,802.

The present invention relates to metal plate construction, and more particularly to metal plates with flat rolled steel bars arranged in edge relationship therewith, and has for an object improved means of securing the bars to the plates.

Another object in view is the provision of means for drawing the bars and plates into firm contact with each other preparatory to securing them together by welding. In order to weld the bar to the plate it is necessary that a good contact be made between the bar and plate entirely along the seam or joint. Since the surface of the metal plates to which the bar is to be secured is in many instances uneven and not entirely a plane surface it is necessary that means be provided for forcibly bringing the plate and the bar together along the line of contact so that there will be no gap or open space between the plate and the bar. The present invention, therefore, provides a plate with bars arranged in abutting edge relationship therewith and secured together by continuous welded seams.

Figure 1 is a perspective view of a fractional base plate with reinforcing bars secured thereto and showing certain of the bracing clips in upstanding condition before being fastened to the reinforcing bar;

Fig. 2 is a cross sectional view showing the means for forcing the reinforcing bar and base together with a portion thereof shown in elevation;

Fig. 3 is a cross sectional view showing the means for forcing the bar and plates together along a seam in the base, with portions thereof shown in elevation.

In the drawing illustrating the invention, a base plate 1 is shown in edge relation with an adjacent plate 2, and over the seam formed by these plates a bar 4 is arranged in abutting edge relation to reinforce the plate along the seam. A similar bar 3 is arranged on edge contact with the plate 1, intermediate the marginal edges, to reinforce the said plate centrally thereof. In order to secure these bars to the said plate by continuous welded seams the said bars must be brought into firm abutting edge relation with the plates. Since the plates are in many instances uneven it is difficult to obtain a good contact of the edges of the bars with the plates. The invention therefore contemplates the use of a tool 5 which is adapted to be used with the said bars to draw or force the bars and plates together, so that a continuous homogeneous weld may be formed at the seam. The tool 5 comprises a yoke 6 which is adapted to be placed upon the top of the bar 3 or 4 and is slidable therealong. The yoke 6 has a recess 7 in which the end of a compression screw 8 operates by a swivel connection as shown at 9. The screw 8 is turned by a handle 10 and has a threaded connection with the lever 11. This lever includes a bent end 12 and a handle 13 which latter is secured to the bent end 12 by the threaded stud 14. A pair of lugs 15, 16, project from the lower end of the bent arm 11 and these lugs are arranged at right angles, one of which lugs is used when bars such as 3 are forced into contact with the plate 1, and the other lug is employed when a bar such as 4 is brought into contact with the base over a seam.

Assuming that a bar such as 3 is to be welded on the line 18, a plurality of upstanding clips 19 will be arranged alternately on each side of the said line; the bar 3 will then be placed on the line 18 and the tool 5 mounted on the said bar with the lug 15 positioned in an opening 21 in one of the clips 19. A man bearing down on the handle 13 will apply an upward pressure to the clip 19 and a downward pressure against the top of the bar 3, as shown by the arrows a and b in Fig. 2. This will cause the plate 1 to be drawn tightly up against the edge 22 of the bar 3, thereby producing a good contact between the said members. When the members are thus in close relation they are welded together as at 17, thus holding them in assembled relation. The tool 5 is then moved on the bar 3 to the next adjacent clip 19, where the aforesaid operation is repeated and the bar 3 brought into close contact at that point with the plate 1 and welded thereto as described.

When the said bar is brought into firm contact with the plate entirely along its length by the use of the said tool 5 as hereinbefore described, and the bar is welded to the plate, the clips 19 are then bent over against the bar 3 as shown in Fig. 1 and the upper end of each clip welded to the bar; thus the clips 19 perform a double purpose, first, as fixed elements against which pressure is exerted by the tool 5 to force the bar 3 into close contact with the said plate, and, secondly, as a brace to support the bar 3 against lateral bending.

The tool 5 is also adapted to be used to force the bar 4 into abutting contact with the confronting edges of adjacent plates 1, 2, so that the said bar may be welded thereto along the seam 23. The bar 4 and the confronting plates 1 and 2 are reinforced by saddles 24 which are spaced at intervals along the said bar. The saddles are each provided with a slot 25 to fit on the said bar, and a hole 27 for engagement with the lug 16 of the tool 5, for forcing the bar into close contact with the plates over the joint. The saddles 27 are first welded to one of said plates as at 26, with the bar 4 in position over the confronting edges of adjoining plates. The tool 5 is then mounted upon the bar 4 adjacent one of the said saddles, with the lug 16 in position in the hole 27 as shown in Fig. 3. The application of pressure on the handle 13 in the direction of the plate will produce an upward pressure of the lug 16 in the hole 27 and a downward pressure on the bar 4 and on the opposite side of the saddle, thus producing a close contact of the bar with the plates 1 and 2, over the seal 23, and a close contact of the opposite portion of the saddle 24 against the plate 1. The said bar is then welded on each side to the said plates, by covering the juncture with welding material 28 and fusing the bar and plates together. The tool 5 is then moved to the next adjacent saddle 24 and the operation repeated and the bar 4 welded to the plates as described. By continuing this procedure with each of the saddles 24 the bar 4 may be welded to the said plates in close contact thereto entirely along the seam 23. The saddles 24 are also welded to the bar and to the plates entirely along the contacting edge therewith and the seam 23 is filled with welding material 29 and the confronting edges of the plates 1 and 2 and the abutting edges of the plates 4 are fused together to form a homogeneous welded connection.

The saddles 24 thus serve a double purpose, first, as fixed elements against which pressure is exerted by the tool 5 to draw the plates and the bar 4 into abutting contact, and, secondly, as bracing members to reinforce the plates and the bar to fix the bar against lateral bending movement.

I claim:

1. The method of forming a metal plate construction, consisting in emplacing on a metal base a member to be secured thereto, securing fulcrum means to the base, applying a lever to the fulcrum means and the member for pressing the base and member together, securing the member to the base while under pressure, removing the lever from the fulcrum means, and securing the fulcrum means to the said member to brace the same.

2. The method of forming a metal plate construction, consisting in contacting with each other a member and a base to to be secured together, permanently securing a clip with a hole to the base beside the member, placing a lever across the member and into the hole, then exercising pressure on the lever to make a tight joint between the member and base, securing the member to the base while under pressure, removing the lever and bending the clip over against the member, and securing the clip to the member.

3. In a metal plate construction, a base plate, a flat metal member arranged in edge relation with the base plate, and bracing members secured to the base plate adapted to be used as fixed elements against which pressure is exerted for drawing the plate and flat metal member in abutting contact, said base plate, flat metal member and bracing members being welded together when in abutting contact to form an integral structure.

4. In a metal plate construction, a base including metal plates arranged in confronting edge relation and with a seam between said confronting edges, a flat bar arranged in edge relation with the said plates and overlapping the said confronting edges of the plates at the said seam, and bracing members arranged in edge relation with the said bar and plates and operating to hold the bar against bending movement on the plates, the said plates, bar, and bracing members being welded together by covering the seam with welding material and fusing the parts to form an integral structure.

Signed at New York city in the county of New York and State of New York the 17th day of April, A. D. 1931.

RICHARD F. SMITH.